Patented Dec. 11, 1945

2,390,853

UNITED STATES PATENT OFFICE 2,390,853

PROCESS FOR PREPARING DICHLORODI-ETHYL ETHER-ALKALI METAL POLY-SULPHIDE CONDENSATION PRODUCTS IN PULVERULENT FORM

Harold Taylor, Blackley, Manchester, England, assignor to Imperial Chemical Industries Limited, a corporation of Great Britain No Drawing. Application August 5, 1943, Serial No. 497,555. In Great Britain July 1, 1942

4 Claims. (Cl. 117—100)

This invention relates to the production of preparations in pulverulent form of rubber-like condensation products from beta-beta-dichlorodiethyl ether and alkali metal polysulphides, either alone or in admixture with minor proportions of dispersed natural and synthetic rubbers.

The said condensation products have hitherto been described only in massive form. We have now found that they can be obtained in pulverulent form by the processes described below. Such pulverulent preparations can then be used for purposes for which the massive preparations cannot, for example as moulding powders and as powders for use in spray guns for coating purposes. The condensation products have the merits as regards use in moulding that they are rubber-like and yet offer high resistance to the action of oils and aliphatic and aromatic solvents. They also have the advantages for use in coating compositions of giving flexible films of high resistance to water, dilute acids, oils and the aforesaid solvents.

According to the invention we made the said pulverulent preparations by mixing an aqueous dispersion of paste-like consistency of one of the said condensation products, either alone or in admixture with a dispersed natural or synthetic rubber, the said dispersion having been treated if desired with synthetic resin-forming ingredients so as to produce a resinous coating on the particles of the dispersion, and/or if desired vulcanising agents, antioxidants or other compounding ingredients having been added in dispersed form, with a dusting powder as hereinafter defined, the average size of the particles of which is much smaller than the average size of those of the dispersion, the weight of the powder being not more than 20% of the dry condensation product and natural or synthetic rubber, if present, in the aqueous dispersion, and subsequently evaporating, at a low, ordinary or moderate temperature, sufficient of the residual water to give a non-tacky product of dry consistency.

By dusting powder we mean a powder which, when applied to a film formed by evaporating a solution of raw rubber in benzene and the excess then blown or shaken off, gives a non-tacky finish that does not feel gritty. As examples of suitable powders there may be mentioned talc, zinc stearate and starch.

The optional feature of the process of the invention is well adapted for making the powders containing natural or synthetic rubbers.

The following examples, in which parts are by weight, illustrate but do not limit the invention.

*Example 1*

An aqueous dispersion of the product obtained by the interaction of beta-beta-dichlorodiethyl ether and sodium tetrasulphide, of paste-like consistency, is thoroughly mixed with zinc stearate dusting powder, using 5% of zinc stearate on the calculated weight of solid interaction product present. The mixture is then vacuum dried at 20° C. The product is a fine powder which passes a 60 mesh sieve (60 meshes to the linear inch).

*Example 2*

To 816 parts of an aqueous dispersion of the interaction product of beta-beta-dichlorodiethyl ether and sodium tetrasulphide containing the equivalent of 100 parts of the dry interaction product there are added 100 parts of an aqueous solution of casein, containing 10 parts of casein and enough ammonia to dissolve it, and the mixture is well stirred.

To the mixture there are then added 55 parts of an aqueous solution, containing 5.5 parts of alum. The addition of alum causes the precipitation of the casein on the particles of the dispersion.

The resulting mixture is then filtered so as to give a moist paste, care being taken to avoid sufficient pressure or suction to cause the particles to cohere. The paste is washed with water until its pH value is 7.0.

The above paste is then stirred into water and 8 parts of 40% formaldehyde added, and the dispersion allowed to stand for about 12 hours.

The dispersion is then filtered, again avoiding coherence and the resulting moist paste then treated with zinc stearate as in Example 1.

A product similar to that of Example 1 is obtained. All the powder passes a 60 mesh sieve, much of it being small enough to pass a finger sieve. The powder showed no sign of cohering after standing for one month.

*Example 3*

To 908 parts of an aqueous dispersion of the same product as that used in the two preceding examples and containing the equivalent of 95 parts of the dry product, are added 50 parts of an aqueous solution of casein, containing 5 parts of casein and enough ammonia to dissolve it. 8.3 parts of 60% rubber latex are then stirred in and these are followed by a mixture of 0.4 part of mercaptobenzthiazole, 1 part of the antioxidant obtained by condensing acetaldehyde with α and β-naphthylamines (see British Patent 280,661), 0.4 part of sulphur and 20 parts of zinc oxide, all these four substances being added as 50% aqueous dispersions, and the quantities mentioned being the quantities of the dispersions.

The remainder of the process which comprises the addition of alum solution and the treatment with formaldehyde and with zinc stearate is effected as in Example 1.

The inclusion of the rubber latex gives a powder from which tougher films can be obtained. The mercaptobenzthiazole, sulphur, and zinc oxide are added as vulcanising ingredients for the natural rubber. Vulcanisation is effected by heating after film forming or moulding.

I claim:

1. The process for preparing in pulverulent form rubber-like condensation products of beta-beta-dichlorodiethyl ether and alkali metal polysulphides which comprises mixing an aqueous dispersion of paste-like consistency of the said condensation products with a dusting powder selected from the class consisting of zinc stearate, talc and starch, the average size of the particles of the dusting powder being much smaller than the average size of those of the dispersion condensation products, the weight of the dusting powder employed being not more than 20% of the weight of the dry rubber-like material in said aqueous dispersion, and evaporating water from the mass to give a non-tacky fine powder in which the particles do not cohere upon standing for an extended period of time.

2. The process of claim 1 wherein the dusting powder employed is zinc stearate.

3. The process for preparing in pulverulent form rubber-like condensation products of beta-beta-dichlorodiethyl ether and alkali metal polysulphides which comprises mixing an aqueous dispersion of paste-like consistency of the said condensation products with an ammoniacal solution of casein, treating the mass with alum to precipitate the casein on the dispersed particles of condensation product, filtering the mass and washing with water until free of ammonia, treating the resulting product with formaldehyde, isolating the resulting material from the formaldehyde solution, dispersing the same in water to form a dispersion of paste-like consistency, adding to said dispersion a dusting powder selected from the class consisting of zinc stearate, talc and starch, the average size of the particles of the dusting powder being much smaller than the average size of those of the dispersion condensation products, the weight of the dusting powder employed being not more than 20% of the weight of the dry rubber-like material in said aqueous dispersion, and evaporating water from the mass to give a non-tacky fine powder in which the particles do not cohere upon standing for an extended period of time.

4. The process of claim 3 wherein the dusting powder employed is zinc stearate.

HAROLD TAYLOR.